Oct. 18, 1927.
I. P. SCHEI
1,645,935
POWDER DISPENSER
Filed March 9, 1927 2 Sheets-Sheet 1
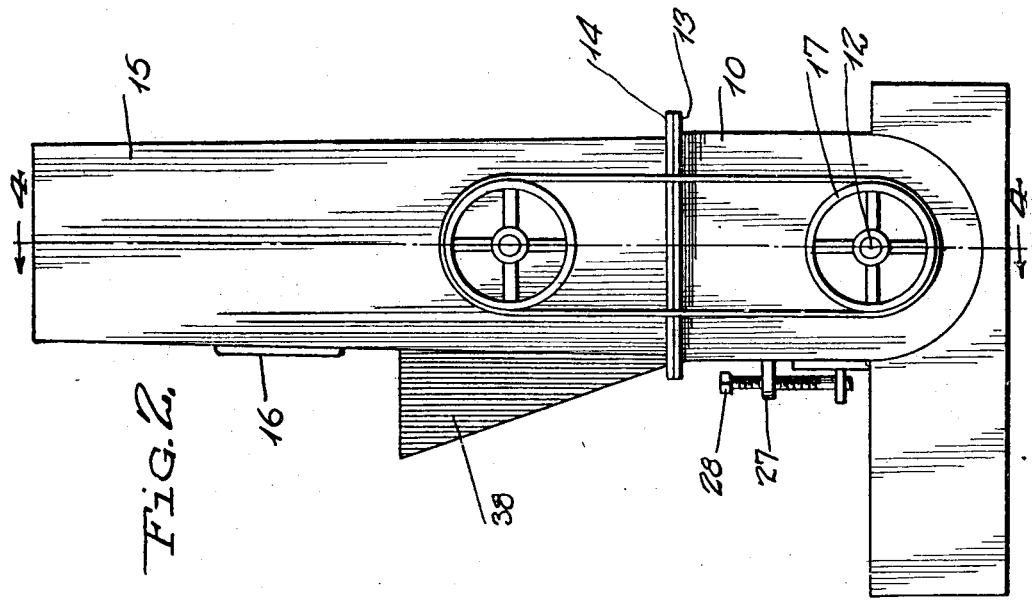
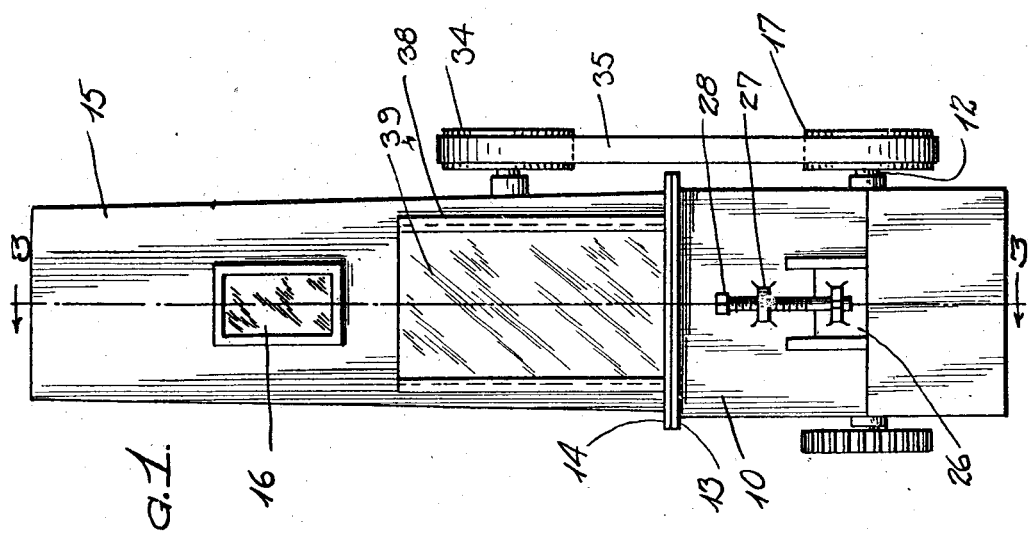
INVENTOR.
Iver P. Schei.
BY L. N. Quillis
ATTORNEY.

Oct. 18, 1927.
I. P. SCHEI
1,645,935
POWDER DISPENSER
Filed March 9, 1927
2 Sheets-Sheet 2
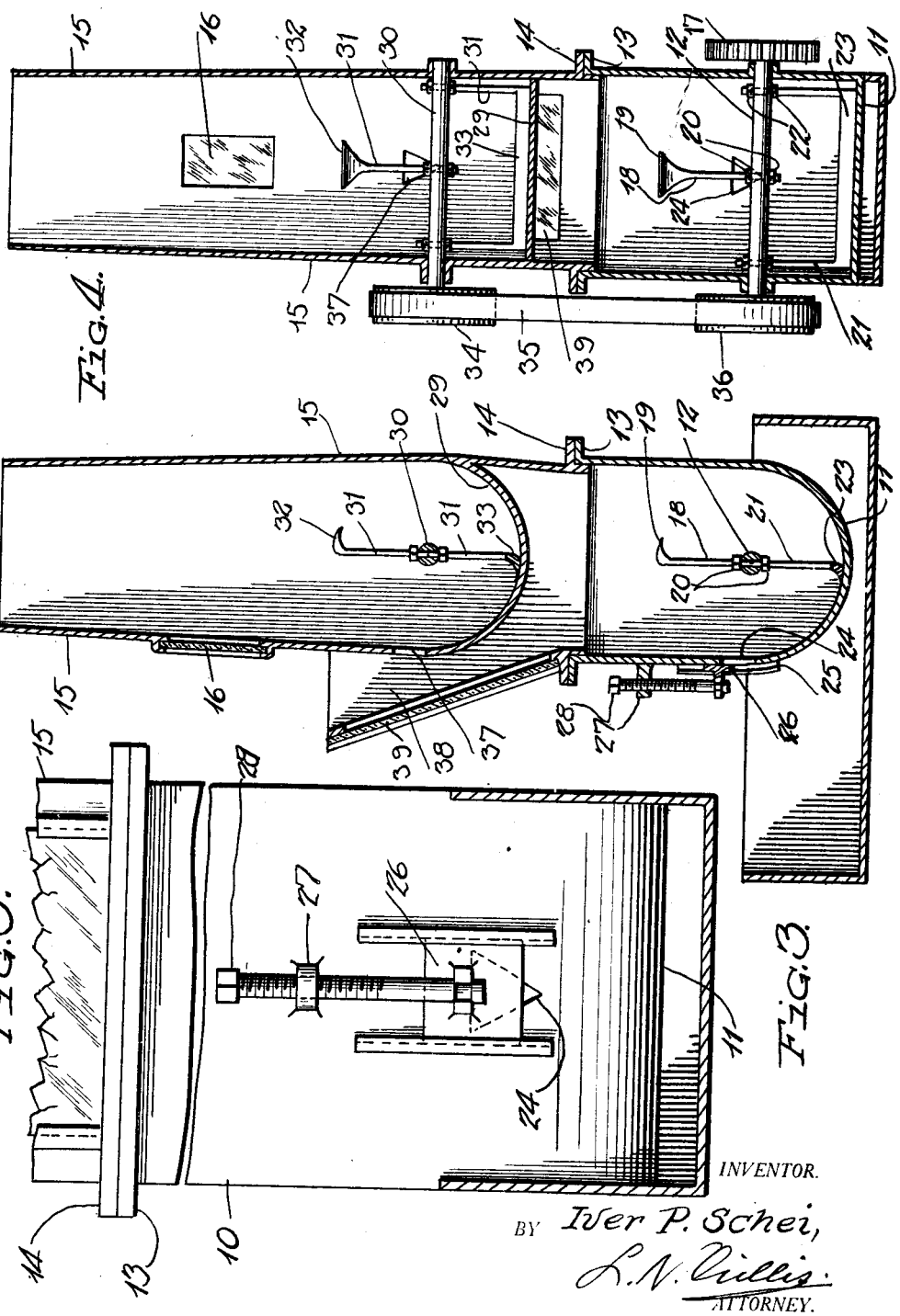
INVENTOR.
BY Iver P. Schei,
L. N. Villis
ATTORNEY.

Patented Oct. 18, 1927.

1,645,935

UNITED STATES PATENT OFFICE.

IVER P. SCHEI, OF FERGUS FALLS, MINNESOTA.

POWDER DISPENSER.

Application filed March 9, 1927. Serial No. 174,030.

This invention relates to a powder dispensing apparatus and has special reference to a dispensing apparatus for adding small quantities of bleaching or other powder, flour or the like.

One important object of the invention is to improve the general construction of a device of this character.

A second important object of the invention is to provide improved means for regularly dispensing from the device uniform quantities of powder, said means being capable of extremely accurate regulation.

A third important object of the invention is to provide an improved arrangement of adjustable stirring and feeding knives or blades in a device of this character.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a front elevation of the machine.

Figure 2 is a side view thereof.

Figure 3 is a section on line 3—3 of Figure 1.

Figure 4 is a section on line 4—4 of Figure 2.

Figure 5 is an enlarged detail view of the delivery opening and gates thereof.

In the embodiment of the invention here illustrated there is provided a lower casing 10 having an arcuate bottom 11 and through this casing passes a shaft 12 concentric with the arcuate bottom. This casing is open at the top and is provided with a flange 13 surrounding the top and arranged to receive the flange 14 of an upper casing or powder reservoir 15 which sets down into the lower casing and tapers gradually toward the top so that powder will not clog therein. On the front of this powder reservoir is a glazed sight window 16 so arranged that the operator may observe the height of the powder in the casing and thus be warned of the proper time to refill the reservoir. The shaft 12 projects through one side of the casing and has mounted thereon a pulley 17 for connection to some suitable source of power by the ordinary belt, not shown. Within the casing 10 this shaft is provided with a set of spaced parallel openings extending diametrically through the shaft and through the center opening of this set passes a shank 18 carrying on its outer end a small knife or blade 19. The shank 18 is threaded and on each side of the shaft there are positioned adjusting nuts 20 so that the blade 19 may be adjusted with relation to the bottom of the casing 10. Extending in an opposite direction from the shank 18 is a pair of threaded shanks 21 which pass through the remaining openings of the shaft and also have adjusting nuts 22. These shanks 21 support the ends of a long knife 23 which extend practically from side to side of the casing and is adjusted to move close to the bottom of said casing. At the front side the casing is provided with a V-shaped discharge opening 24 and on the exterior there is provided on each side of this discharge opening a vertical guide 25. These guides are used to support and guide a gate 26 which forms a valve for the opening 24. Above the gate 26 the front of the casing supports a bracket 27 and through this bracket passes an adjusting screw 28 by means of which the positions of the gate 26 may be accurately and minutely adjusted.

Moreover, the upper section 15 of the casing also is provided with a semi-cylindrical bottom 29 and across this upper casing runs a shaft 30 from which extends arms 31 carrying blades 32 and 33 like the blades 19 and 23. On the shaft 30 is mounted a belt pulley 34 which is connected by a belt 35 to the belt pulley 36 so that both shafts 12 and 30 revolve in unison. About opposite the shaft 30 the casing 15 is provided with an opening 37 which opens into a chute 38 having a glass front 39. By this means the weight of the material is divided between the upper and lower casings and fed gradually from the upper casing into the lower casing, being delivered from the latter without the lower casing being jammed with an excess of the material.

In use the powder is placed in the reservoir and in the upper casing 10 until the reservoir has been filled to the desired height. The shaft 12 is then started and the knives or blades will revolve and force small quantities of the powder out of the discharge openings, the quantity delivered from the opening 24 being in accordance with the position of the gate 26. It will be noted that by reason of the peculiar long and short knife arrangement the powder will be kept from collecting on the sides and bottom of the casing and will be constantly stirred so that it will flow freely through the opening 24 the proper quantity being delivered at each half revolution of the shaft.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a powder dispenser, a casing having a delivery opening, a shaft extending transversely of the casing, means to rotate said shaft, stirrer and feeder blades carried by the shaft, and means to adjust said blades to and from the shaft.

2. In a powder dispenser, a casing having a delivery opening, a shaft extending transversely of the casing, means to rotate said shaft, stirrer and feeder blades having threaded shanks extending through the shaft, and adjusting nuts carried by each shank and engaging opposite sides of the shaft whereby to adjust the blades to and from the shaft.

3. In a powder dispenser, a casing having a delivery opening, a shaft extending transversely of the casing, means to rotate said shaft, stirrer and feeder blades carried by the shaft, and means to adjust said blades to and from the shaft, one of said blades extending substantially across the casing and the other blade being positioned with reference to the shaft diametrically opposite the first blade and being relatively short.

4. In a powder dispenser, a casing having a delivery opening, a shaft extending transversely of the casing, means to rotate said shaft, stirrer and feeder blades having threaded shanks extending through the shaft, and adjusting nuts carried by each shank and engaging opposite sides of the shaft whereby to adjust the blades to and from the shaft, one of said blades extending substantially across the casing and the other blade being positioned with reference to the shaft diametrically opposite the first blade and being relatively short.

5. In a powder dispensing device, a casing having a V-shaped delivery opening, a gate for regulating the size of the opening, a shaft extending transversely of the casing, means to rotate said shaft, stirrer and feeder blades carried by the shaft, and means to adjust said blades to and from the shaft.

6. In a powder dispensing device, a casing having a V-shaped delivery opening, a gate for regulating the size of the opening, a shaft extending transversely of the casing, means to rotate said shaft, stirrer and feeder blades having threaded shanks extending through the shaft, and adjusting nuts carried by each shank and engaging opposite sides of the shaft whereby to adjust the blades to and from the shaft.

7. In a powder dispensing device, a casing having a V-shaped delivery opening, a gate for regulating the size of the opening, a shaft extending transversely of the casing, means to rotate said shaft, stirrer and feeder blades carried by the shaft, and means to adjust said blades to and from the shaft, one of said blades extending substantially across the casing and the other blade being positioned with reference to the shaft diametrically opposite the first blade and being relatively short, said second blade being about the same width as said opening.

8. In a powder dispensing device, a casing having a V-shaped delivery opening, a gate for regulating the size of the opening, a shaft extending transversely of the casing, means to rotate said shaft, stirrer and feeder blades, one of said blades extending substantially across the casing and the other blade being positioned with reference to the shaft diametrically opposite the first blade and being relatively short, said second blade being about the same width as said opening.

9. In a powder dispenser, a casing having a delivery opening, a shaft extending transversely of the casing, means to rotate said shaft, stirrer and feeder blades carried by the shaft, means to adjust said blades to and from the shaft, a partition above said shaft, a second shaft extending transversely of the casing and carrying stirrer and feeder blades, said second shaft being positioned above the partition and the casing having a second delivery opening substantially opposite the second shaft, and a chute arranged to conduct material from the second opening to the casing below the partition.

10. In a powder dispenser, a casing having a delivery opening, a shaft extending transversely of the casing, means to rotate said shaft, stirrer and feeder blades having threaded shanks extending through the shaft, adjusting nuts carried by each shank and engaging opposite sides of the shaft whereby to adjust the blades to and from the shaft, a partition above said shaft, a second shaft extending transversely of the casing and carrying stirrer and feeder blades, said second shaft being positioned above the partition and the casing having a second delivery opening substantially opposite the second shaft, and a chute arranged to conduct material from the second opening to the casing below the partition.

11. In a powder dispenser, a casing having a delivery opening, a shaft extending transversely of the casing, means to rotate said shaft, stirrer and feeder blades carried by the shaft, means to adjust said blades to and from the shaft, one of said blades extending substantially across the casing and the other blade being positioned with reference to the shaft diametrically opposite the first blade and being relatively short, a partition above said shaft, a second shaft extending transversely of the casing and carrying stirrer and feeder blades, said second shaft being positioned above the partition and the casing having a second delivery opening substantially opposite the second shaft, and a chute arranged to conduct material from the second opening to the casing below the partition.

12. In a powder dispenser, a casing having a delivery opening, a shaft extending transversely of the casing, means to rotate said shaft, stirrer and feeder blades having threaded shanks extending through the shaft, adjusting nuts carried by each shank and engaging opposite sides of the shaft whereby to adjust the blades to and from the shaft, one of said blades extending substantially across the casing and the other blade being positioned with reference to the shaft diametrically opposite the first blade and being relatively short, a partition above said shaft, a second shaft extending transversely of the casing and carrying stirrer and feeder blades, said second shaft being positioned above the partition and the casing having a second delivery opening substantially opposite the second shaft, and a chute arranged to conduct material from the second opening to the casing below the partition.

In testimony whereof I affix my signature.

IVER P. SCHEI.